March 8, 1932.  G. F. KUHN ET AL  1,848,729
AIR TIGHT MEAT COOKING CONTAINER AND PROCESSOR
Filed Nov 11, 1930
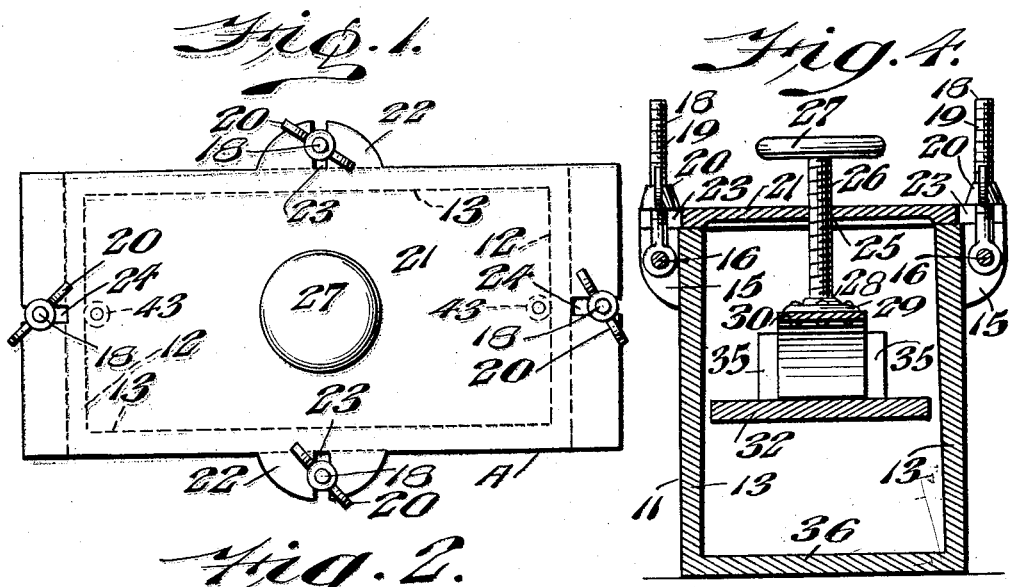
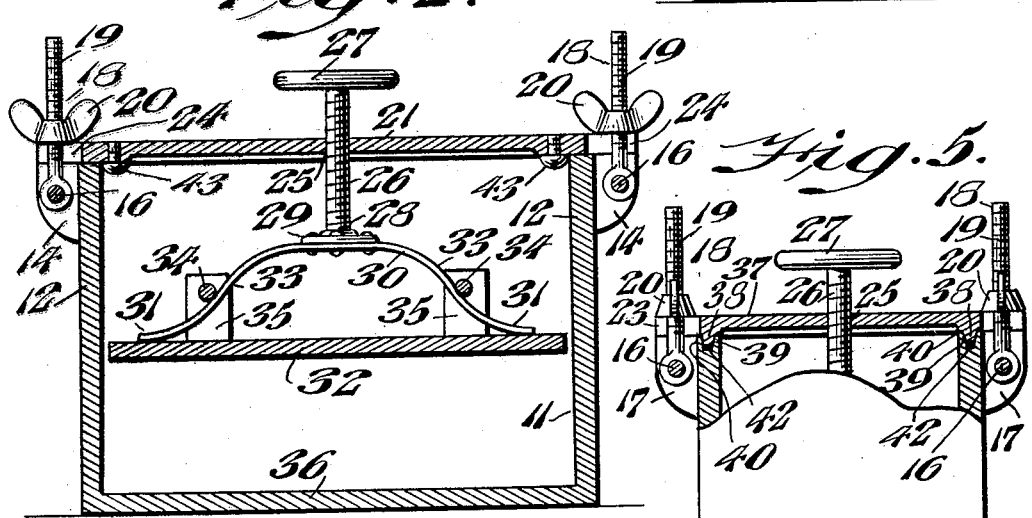
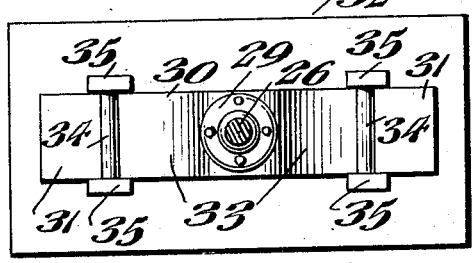
INVENTORS
GUS F. KUHN.
HENRY JANSSEN.
BY E. Guyer Murphy
ATTORNEY Patented Mar. 8, 1932

1,848,729

UNITED STATES PATENT OFFICE

GUSTAVE F. KUHN AND HENRY JANSSEN, OF PHILADELPHIA, PENNSYLVANIA

AIR TIGHT MEAT COOKING CONTAINER AND PROCESSOR

Application filed November 11, 1930. Serial No. 494,853.

This invention relates in general to a meat cooking container and processor, having for its object the provision of certain desired improvements in a device of the kind desired assuring an air tight container and a highly efficient means for compressing meats during the cooking or processing stages.

Another object is to provide an air tight meat processor and container suitable for commercial use with means facilitating the expeditious handling of meats during preparation for packing.

Other objects and advantages of the invention will appear hereinafter when taken in connection with the accompanying drawings in which, Figure 1 is a top plan view of an embodiment of our invention;

Figure 2 is a longitudinal sectional view of the device shown in Figure 1;

Figure 3 is a bottom plan view of the means employed for applying pressure to the meats during cooking;

Figure 4 is a transverse sectional view of the device, and

Figure 5 is an end elevational view, partly in section, parts broken away of a slightly modified form of the invention.

For the purpose of illustrating our invention, we have shown in the accompanying drawings forms thereof which are at present preferred by us, since the same has been found in practice to give satisfactory and reliable results, although it is to be understood that the various instrumentalities of which our invention consists can be variously arranged and organized, and that our invention is not limited to the precise arrangement and organization of the instrumentalities as herein shown and described.

In the drawings wherein similar characters of reference indicate corresponding parts in the several views of the preferred forms of the invention, A designates our air tight container which comprises a box or casing 11 of any desired configuration provided with end walls 12—12 and side walls 13—13.

To the end and side walls 12—12, 13—13, lugs 14, 15 respectively are secured, these lugs having pins 16 fastened thereto. The pins 16 are received in annular sockets or holes 17 at the end of eyebolts 18 which are swingingly mounted on the pins 16. On the threaded stems 19 of the eye bolts, wing nuts 20 are engaged for a purpose which will appear hereinafter.

A lid 21 formed with side lugs 22 registering with the lugs 15 of the side walls 13 of the box 11, fits over and rests on the top of the latter. The lugs 22 have slots 23 which receive the threaded stems 19 of the eye bolts 18, as shown in Figures 1 and 2, thereby permitting the wing nuts 20 to engage the top of the lugs 22 in order to clampingly secure the lid 21 to the box 11. The ends of the lid 21 are also formed with slots 24 which accommodate the threaded stems 19 of similar eye bolts 18 mounted on pins 16 fastened in lugs 14 secured on the end walls 12 of the box 11. The lugs 22 and slots 24 in coaction with the eye bolts 18 and wing nuts 20 serve as mentioned above to clampingly and adjustably secure the lid 21 in an air tight manner to the box 11.

The lid 21 has a threaded hole 25 in which is engaged a threaded shank 26 secured to a manipulating handle 27. The lower end 28 of the shank 26 is rotatably confined in a socket plate 29 riveted or otherwise secured to a leaf spring 30 of a curved configuration, the ends 31 of which slidingly contact the compression plate 32 for a purpose hereinafter appearing. A sloping or arcuate portion 33 on either side of the centre of the spring leaf 30 is engaged with pins or bars 34 fastened in guiding lugs 35 secured to the compression plate 32. By means of the pins 34 and the guiding lugs 35, the ends 31 of the leaf spring 30 are maintained in contact with the upper surface of the plate 32, while the plate 32 itself is supported in the position best shown in Figure 2.

Assuming meat, etc., to have been placed in the box 11 on the floor 36 thereof, by turning the handle 27 in a clockwise direction, the threaded shank 26 will descend and consequently thrust downwardly the leaf spring 30 which carries the compression plate 32. As the latter descends, compressing the meat, the ends 31 of the leaf spring 30 will slide over the upper surface of the compression plate 32, while the arcuate portions 33 pass under the pins 34 and between the guiding lugs 35.

In the modified form of the invention shown in Figure 5, we have formed the lid 37 with a depending beading 38 which is received in a groove 39 formed in the edge 40 of the box 41 shown therein, a gasket 42 being employed, if desired, between the beading 38 and the surface of the groove 39. The other parts of the lid 37 and box 41 are identical with the other embodiments shown in Figures 1 to 4 inclusive, this being indicated by the similarity of the reference numerals employed. We have found the beading 38 and the groove 39 with the gasket 42 to provide a seal exceptionally efficient, although the form shown in Figures 1 to 4 also provides an air tight container.

As is well known in the meat packing and processing art, it is essential to have an air tight container wherein the various kinds of meats are preliminarily subjected to a cooking which is generally accomplished by immersing the container in boiling water under pressure in excess of atmospheric pressure. It is also desirable when the meats have been preliminarily cooked, to have means for applying pressure to said meats in order to give them a shape suitable for packing into the various containers in which they are dispensed to the trade. We have found in practice that the leaf spring 30 which is secured to the shank 26 in combination with our compression plate 32 serves to apply the pressure in a manner best adapted to distribute and equalize the pressure over the entire body of the meat, as the leaf spring maintains a continuous pressure upon the meat while the latter is being continuously reduced in volume. This latter effect is not obtained with the same efficiency in compression plates which are directly attached to a non-resilient member, since immediately after the first compression of the meat, unless the operator continues to apply further pressure, the desired results will not be obtained; whereas by means of the resilient spring 30 of our invention, after the initial setting or application of the desired pressure by the turning of the handle 27, the leaf spring 30 will accomplish the desired results automatically.

As a convenient means of registering the lid 21 of our device in alignment with the box or container 11, we employ the bolts 43 the heads of which engage the inner sides of the walls of the box, and thus quickly place the lid over the top of the box in position to allow the shanks or stems 19 of the eye bolts 18 to be received in the slots 24 formed in the ends of the lid 21.

In accordance with our process, we prepare or cook the meats in their own juices and not in boiling water which has been customary in the past. It is a well known fact that when meats are prepared or processed by boiling directly in water a considerable percentage, if not all, of the natural juices of the meats pass into solution with the boiling water and are practically lost. In addition to this, the meats after being boiled directly in water suffer a much greater shrinkage than takes place when prepared in accordance with our method and means since the meats are placed in the box or container 11 and then hermetically sealed therein by clamping the lid 21 in the manner indicated in Figures 2 and 5, which best illustrate the manner in which we prepare or process meats for packing.

We are aware that the invention may be embodied in other specific forms without departing from the spirit or essential attributes thereof, and we therefore desire the present embodiment to be considered in all respects as illustrative and not restrictive, reference being had to the appended claim rather than to the foregoing description to indicate the scope of the invention.

Having thus described our invention what we claim as new and desire to secure by Letters Patent, is:—

A meat cooker and processor comprising a container, a spring pressed plunger therein, means for actuating said spring, a lid for said container, inverted domes on the underside of said lid for automatically aligning said lid with respect to the walls of said container, and means for clamping said lid to said container.

GUS. F. KUHN.
HENRY JANSSEN.